United States Patent [19]

Cannarsa et al.

[11] Patent Number: 4,773,466

[45] Date of Patent: Sep. 27, 1988

[54] PROCESS FOR PREPARING POLYCARBONATE COPOLYMER FOAM SUITABLE FOR LOST FOAM CASTING

[75] Inventors: Michael J. Cannarsa, Lafayette Hill; Haven S. Kesling, Jr., Drexel Hill; Hsiang-Ning Sun, Media, all of Pa.

[73] Assignee: ARCO Chemical Company, Newtown Square, Pa.

[21] Appl. No.: 132,099

[22] Filed: Dec. 14, 1987

[51] Int. Cl.$^4$ ............................................... B22C 7/02
[52] U.S. Cl. ......................................... 164/45; 164/34
[58] Field of Search ...................... 164/45, 34, 35, 36, 164/246

[56] References Cited

U.S. PATENT DOCUMENTS 4,633,929  1/1987  Santangelo et al. .................. 164/34

Primary Examiner—Kuang Y. Lin
Attorney, Agent, or Firm—Lewis J. Young

[57] ABSTRACT

The evaporative casting of molten metals has been shown to produce castings having smooth surfaces without any sign of carbon deposits thereon by using a copolymer polycarbonate prepared from cyclohexene oxide, cyclopentene oxide, cycloheptene oxide, or isobutylene oxide and carbon dioxide.

7 Claims, No Drawings

PROCESS FOR PREPARING POLYCARBONATE COPOLYMER FOAM SUITABLE FOR LOST FOAM CASTING

BACKGROUND OF THE INVENTION

The present invention is directed to an improved process for producing metal castings using the lost foam casting process.

Lost Foam Casting (Full Mold Casting) involves placing a plastic pattern of the desired cast part in sand and then pouring molten metal onto the plastic casting causing it to vaporize. The molten metal exactly reproduces the plastic pattern to provide the ultimate casting. Many patents have issued covering the Lost Foam Casting process.

It is known that polystyrene, the major polymer used in this application, produces surface defects when casting iron due to carbon residues left by the polymer. When casting low carbon steel the carbon formed from the polystyrene dissolves in the metal degrading the properties of the cast part. A number of patents describe variations in the Lost Foam Casting process that are intended to minimize the residues left by the polymer after the metal has been poured. Most of these variations involve changing the coating on the pattern or changing the flask in which the casting is made. For example, U.S. Pat. Nos. 4,448,235 and 4,482,000 describe a variable permeability casting designed to avoid entrapment of polymer vapors in the casting. U.S. Pat. No. 3,572,421 describes a flask containing many air breathing holes to allow the escape of polymer degradation products to decrease the formation of carbon. Similarly, U.S. Pat. Nos. 3,842,899, 3,861,447 and 4,612,968 describe the addition of vacuum to the casting flask to aid in the removal of the polymer residues.

The Dow Chemical Company has recently reported the development of a polymethyl methacrylate foam bead useful to replace polystyrene for the casting process. (Moll and Johnson, "Eliminate the Lustrous Carbon Defect With New Moldable Foam", Evaporative Foam Casting Technology II Conference, Nov. 12-13, 1986, Rosemont, Illinois). Although this polymer reduces residues left on the cast part, it carries with it other disadvantages. The higher glass transition temperature (130° C.) of the polymer causes longer molding cycles when preparing patterns. It uses a Freon blowing agent which has been shown to cause corrosion of molds. It also rapidly gives off a large volume of gas when castings are made. It is very difficult to control the evolution of gas and often the molten metal is blown back out of the flask.

There is still a great need for a polymer that provides the advantages of polystyrene but produces no carbon defects. U.S. Pat. No. 4,633,929 addresses this need with a polyalkylene carbonate copolymer which decomposes cleanly to give no carbon defects. The synthesis of various polyalkylene carbonate copolymers is well known in the art (see Inoue, U.S. Pat. No. 3,900,424). It is also well established that polyalkylene carbonates readily undergo thermal decomposition with little or no carbon residue (Frechet, Macromolecules 19, 13-19 (1986); and Polymer J. 19, 31-49 (1987)). These facts were applied to Lost Foam Casting by U.S. Pat. No. 4,633,929.

U.S. Pat. No. 4,633,929 teaches to use polyethylene carbonate and polypropylene carbonate in patterns for a foam process. However, the glass transition temperatures of these two materials are 10° C. and 42° C., respectively, and the temperatures at which the sand is recycled in the Lost Foam Process is normally between 65 and 80° C. Further, the ceramic coating on the pattern is dried at 65–80° C. When subjected to these temperatures a polymer with a Tg of less than 80° C. would tend to deform.

The known freeze-drying foaming method for making foam patterns gives polyalkylene carbonate with high density, nonuniform cell structure and poor surface quality. Complex patterns are difficult to make using this approach. Foam sheet can be made using this approach but cutting patterns from foam sheet is expensive and not favored by manufacturers using the Lost Foam Casting process. For utility, the polyalkylene carbonate should be in the form of small spherical beads which can be easily expanded and molded to provide a foam pattern with 0.9–1.3 pcf density.

Little prior art is available on preparation of foam from polycarbonate polymers. U.S. Pat. No. 4,587,272 shows foams prepared from aromatic polycarbonates using chemical blowing agents. However, there is no prior art for preparing low density polyalkylene carbonate foam patterns suitable for Lost Foam Casting.

BRIEF SUMMARY OF THE INVENTION

We have now developed a process for the preparation of polyalkylene carbonate copolymer foam suitable for Lost Foam Casting applications. Pre-expanded beads prepared by this process can be used in conventional steam molding equipment to produce low density patterns.

Iron castings produced from patterns made from a copolymer of cycloheptene oxide and carbon dioxide, cyclohexene oxide and carbon dioxide, cyclopentene oxide and carbon dioxide, or isobutylene oxide and carbon dioxide show no signs of lustrous carbon defects. The polyalkylene carbonates smoothly and controllably decompose to a high boiling, carbonate monomer which diffuses through the ceramic coating of the pattern; thus there is no rapid, uncontrollable gas evolution as is observed with polymethyl methacrylate.

The polyalkylene carbonate copolymers have glass transition temperatures very close to polystyrene, and thus the cycle times for molding are very similar. Also, the polyalkylene carbonate copolymers can be expanded using pentane and other hydrocarbons as blowing agents. Freons, which are known to corrode molds and have other environmental problems associated with them, can be used but are not required.

DETAILED DESCRIPTION OF THE INVENTION

The copolymers useful in the present invention include polyalkylene carbonates prepared from cyclopentene oxide, cyclohexene oxide, cycloheptene oxide, or isobutylene oxide and carbon dioxide. Polycyclopentene carbonate, with a Tg of 89° C., is preferred since impregnated beads are easily expanded with atmospheric pressure steam in conventional equipment.

Polyalkylene carbonate copolymers prepared from cyclopentene oxide, cyclohexene oxide, and cycloheptene oxide have the following general formula:

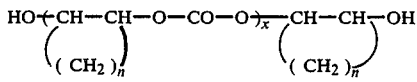

Where n is 3, 4, or 5 and x is in the range of 100 to 450 with the preferred range being 300 to 350.

Polyalkylene carbonate copolymers prepared from isobutylene oxide have the following general formula:

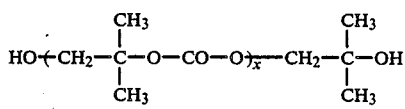

where x is as defined above.

The number average molecular weight of the polycarbonates is in the range 15,000 to 100,000 with the preferred range being 30,000 to 50,000. The polymer has only a single glass transition temperature in the range 85–130° C.

The copolymer is prepared by reacting a mixture of cyclopentene oxide, cyclohexene oxide, cycloheptene oxide, or isobutylene oxide in a solvent such as methylene chloride or hexane under apressure of 100 to 700 psig of carbon dioxide using a zinc carboxylate catalyst for up to 40 hours at 25 to 110° C. in accordance with the polymerizations described in either Soga et al, Polymer J. 16, 407 (1981) or Inoue, Makromol. Chem., Rapid Commun. 1 , 775 (1980), both of which are hereby incorporated in their entirety herein. Thus, Soga et al teach copolymerization of propylene oxide and carbon dioxide by heating at 60° C. for 40 hours using zinc carboxylate catalysts supported on such materials as silicon dioxide, magnesium oxide and aluminum oxide. Inoue used catalysts prepared by the reaction of zinc oxide with aromatic dicarboxylic acids to polymerize propylene oxide in carbon dioxide at 35° C. for 40 hours. Other catalysts such as zinc dialkyls and aluminum porphyrins are also useful in the invention.

The copolymer is isolated by filtering off the insoluble catalyst residues and precipitating the polymer from the solvent by the addition of a non-solvent such as methanol. The polymer is then dried in a vacuum oven at 70° C.

Preparation of low density, strong uniform patterns with good surface finish requires small spherical beads of polymer having bead diameters between 100 and 1000 microns, preferably between 200 and 500 microns. The beads, once formed, are impregnated with blowing agent by a process similar to that used for polystyrene as described in U.S. Patent 2,983,692 issued to Koppers Company. The beads are suspended in an aqueous suspension containing finely divided calcium phosphate and ananionic surfactant. Any of a number of low boiling blowing agents such as butane, n-pentane, isopentane, hexane, carbon dioxide, and fluorinated hydrocarbons, such as Freon 11, Freon 113, Freon 114, Freon 22, or mixtures of these is then added, and the suspension is sealed and heated to 95°–135° C. for 2–6 hours. After impregnation the beads are acid washed and air dried to remove water. The blowing agent incorporation is determined by weighing a sample of dry beads before and after subjecting them to 130° C. for 2 hours. The weight loss under these conditions corresponds to the blowing agent level. Typically 5–15 weight percent of blowing agent can be incorporated into the beads.

The impregnated beads are then pre-expanded to about 1 to 4 pounds per cubic foot (pcf) by subjecting them to atmospheric steam. The lowest density beads are obtained using vacuum expansion as described by Immel (U.S. Pat. No. 3,577,360). Using these techniques 0.8 to 1.2 pcf beads are obtained. A typical expansion/cooling cycle requires 3 minutes. Following pre-expansion the beads are aged to allow for equilibration of gas pressure within the foam cells.

The expanded, aged beads are molded into the desired pattern using techniques similar to those described by Stastny in U.S. Pat. No. 2,787,809. The mold cavity is charged with pre-expanded, aged beads. Steam is then injected into the mold to cause the particles to fill voids and fuse to form a single pattern. The mold is then cooled until the pattern can be removed without distortion.

The molded patterns are attached, using a hot-melt adhesive, to runners and a down-sprue to allow the molten metal to travel from the top of the flask to the pattern. The pattern and runners are then coated with a refractory such as an aqueous silica suspension and allowed to dry. The coated pattern is then placed on a bed of loose sand in the casting flask and covered with loose, unbonded sand leaving only the top of the down-sprue exposed for metal pouring. The sand is then compacted around the pattern by vibration of the casting flask.

Molten grey iron at 1427° C. is then poured onto the down-sprue. The molten metal flows into the flask, vaporizing the polymer and forming the cast part. After the flask is allowed to cool for approximately ten minutes the sand and casting are dumped out of the flask. The casting is an exact replica of the polymer pattern with a smooth surface with no signs of carbon deposits.

The following examples are meant to illustrate, but not limit the invention.

EXAMPLE I

A 500cc autoclave was charged with 60g of cyclohexene oxide, and carbon dioxide and the mixture polymerized according to the procedure of Soga in an organic solvent. The polymer was precipitated with methanol. The polymer was then dried in a vacuum oven overnight at 70° C.

Gel permeation chromatography (GPC) indicated the product had a number average molecular weight of 35,000 and weight average molecular weight of 210,000. Nuclear magnetic resonance (NMR) spectroscopy confirmed that the structure was a polycarbonate containing alternating epoxide and carbon dioxide units. Less than 2% ether linkages were present. The polymer had a single glass transition temperature of 125° C. and a single onset of decomposition of 280° C. A single decomposition temperature confirms that the polymer is a true copolymer.

The dried polymer was ground with a Wiley mill to form fine granular beads with a size range of 200 to 500 microns. These beads were then impregnated with n-pentane by placing 100 cc of distilled water, 2.0 g of tricalcium phosphate, 2.0 g of a 1% aqueous solution of sodium dodecybenzene sulfonate, and 1.5 g of a 10% aqueous solution of polyoxyethylene(20)sorbitan monolaurate together with 100 g of polymer beads and 8.0 g of n-pentane in an 8 oz citrate bottle. The bottle was capped and heated in an oil bath with agitation at 125° C. for 5 hours. The bottle was then cooled, opened and the polymer was separated from the aqueous layer. The beads were then washed with 100 cc of 0.1 N HCl to remove residual phosphate salts. A 2 g sample was left to air dry for three hours, weighed and heated for 2 hours at 130° C. to drive off the blowing agent. The final weight after heating was 1.86 g indicating the presence of 7 wt % of n-pentane in the impregnated beads.

The impregnated beads were then pre-expanded by subjecting them to atmospheric steam. They were then air dried overnight. The ultimate density obtained was 1.8 pcf. When the expansion was repeated under vacuum at 105° C. for 5 minutes followed by cooling under vacuum, the ultimate density obtained was 1.0 pcf.

The 1.0 pcf beads were then injected into a 1"×4"×8" plaque mold and heated to 100° C. with steam for 2 minutes. Following cooling for 2 minutes the pattern was ejected from the mold to provide a smooth surface, resilient pattern with good mechanical strength.

The pattern was then attached to a runner system and sprue with Styro Bond 52.3 Hot Melt Adhesive from Thiem Corporation. The runner and sprue system was also prepared using the copolymer. An identical polystyrene pattern was also attached to the same sprue with a separate runner. The pattern was then coated with Styro Kote Refractory Coating (a silica based aqueous coating from Thiem Corp.) and allowed to dry overnight. The assembled pattern was then packed with loose sand into a casting flask and the sand was compacted using a General Kinematics Compaction Table. Molten grey iron at 1427° C. was then poured onto the sprue to fill the pattern and evaporate the polymers. After cooling for 10 minutes, the casting was dumped out of the flask. The casting produced using the polystyrene pattern showed obvious pitting and lustrous carbon on its surface. In contrast, the pattern produced using the polycarbonate copolymer had a smooth defect-free surface.

EXAMPLE II

A 500 cc autoclave was charged with 60 g of cyclopentene oxide and carbon dioxide and the mixture polymerized according to the method of Soga. The polymer was precipitated with methanol. The polymer was then dried in a vacuum oven overnight at 70° C.

GPC indicated the product had a number average molecular weight of 40,000 and a weight average molecular weight of 240,000. NMR confirmed that the structure was polycarbonate containing alternating epoxide and carbon dioxide units. Less than 2% ether linkages were present. The polymer had a single glass transition temperature of 90° C. and a single onset of decomposition of 260° C.

Beads were prepared from the dried polymer by first dissolving it in propylene glycol-t-butyl ether at 115° C. with rapid stirring. The solution was slowly cooled to 80° C. at which time discrete particles precipitated from solution. The recovery of polymer was 90% and 85% were in the desired size range of 200 to 600 microns. These beads were then impregnated, expanded, and molded as described in Example I. Casting prepared from these molds showed the same advantages as described in Example I.

EXAMPLE III

A 500 cc autoclave was charged with 200 g of cyclopentene oxide, 7 g of (5,10,15,20-tetraphenylporphyrinato) aluminum chloride, 4 g of tetraethyl ammonium bromide, and 200 cc of methylene chloride. The autoclave was then sealed and pressurized with 500 psig of carbon dioxide. The reactor was then heated to 50° C. for 24 hours. Upon completion of the reaction the polymer was precipitated with methanol leaving the catalyst in solution. The polymer was then dried in a vacuum oven overnight. at 70° C.

GPC indicated the product had a number average molecular weight of 20,000 and weight average molecular weight of 100,000. NMR confirmed that the structure was polycarbonate containing alternating epoxide and carbon dioxide units. Less than 2% ether linkages were present. The polymer had a single Tg of 90° C. and a single onset of decomposition of 260° C.

Beads were prepared from the dried polymer by extruding through a 0.02" die into water, followed by chopping to give 85% of the polymer in the size range of 300 to 500 microns. These beads were then impregnated, expanded, and molded as described in Example I. Casting prepared from these molds showed the same advantages as described in Example I.

We claim:

1. A process for preparing a pattern for use in making metal castings which have no residual carbon on the surface comprising
    (a) selecting a copolymer polycarbonate of general formula which is selected from the group consists of

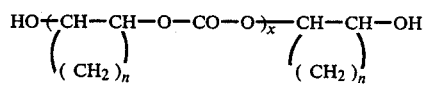

and

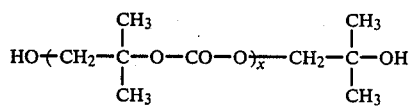

where n is 3, 4, or 5, x is in the range of 100 to 500, the number average molecular weight is in the range 15,000 to 100,000, said polymer has only a single glass transition temperature in the range 85–130° C.,
    (b) forming said copolymer into particles having a bead size between 100 and 1000 microns in diameter,
    (c) suspending said particles in water using a suitable suspending agent system,
    (d) adding a suitable blowing agent to the suspension and heating to impregnate the particles,
    (e) separating the impregnated beads from the aqueous suspension, washing and drying the beads,
    (f) pre-expanding the beads by subjecting to atmospheric steam to obtain a density of about 1 to about 4 pounds per cubic foot,
    (g) aging the beads, and
    (h) molding the beads into the desired pattern having a density of about 3.0 pcf or less.

2. The process of claim 1 wherein the copolymer polycarbonate is a copolymer of cyclopentene oxide and carbon dioxide.

3. The process of claim 1 wherein the copolymer polycarbonate is a copolymer of cyclohexene oxide and carbon dioxide.

4. The process of claim 1 wherein the copolymer polycarbonate is a copolymer of cycloheptene oxide and carbon dioxide.

5. The process of claim 1 wherein the copolymer polycarbonate is a copolymer of isobutylene oxide and carbon dioxide.

6. The process of claim 1 wherein said suitable suspending agent system is a finely divided calcium phosphate and an anionic surfactant.

7. The process of claim 1 wherein said suitable blowing agent is selected from the group consisting of butane, n-pentane, isopentane, hexane, carbon dioxide, and the fluorinated hydrocarbons and mixtures of these.

* * * * *